US007644044B2

(12) United States Patent
Candelore

(10) Patent No.: US 7,644,044 B2
(45) Date of Patent: Jan. 5, 2010

(54) SYSTEMS AND METHODS TO DISTRIBUTE CONTENT OVER A NETWORK

(75) Inventor: Brant Candelore, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 96 days.

(21) Appl. No.: 11/696,324

(22) Filed: Apr. 4, 2007

(65) Prior Publication Data
US 2008/0249946 A1 Oct. 9, 2008

(51) Int. Cl.
*G06F 17/60* (2006.01)
(52) U.S. Cl. ............................. 705/57; 705/51; 705/59
(58) Field of Classification Search .............. 705/57, 705/51, 59
See application file for complete search history.

(56) References Cited

U.S. PATENT DOCUMENTS

| 7,130,802 | B1 * | 10/2006 | Mehregany et al. ............. 705/1 |
| 2003/0126086 | A1 | 7/2003 | Safadi |
| 2005/0169473 | A1 | 8/2005 | Candelore |
| 2006/0026691 | A1 | 2/2006 | Kim |
| 2006/0080529 | A1 | 4/2006 | Yoon |
| 2006/0242069 | A1 * | 10/2006 | Peterka et al. ............. 705/50 |
| 2007/0104104 | A1 * | 5/2007 | Abu-Amara ............. 370/235 |
| 2007/0107062 | A1 * | 5/2007 | Abu-Amara ............. 726/26 |
| 2007/0110012 | A1 * | 5/2007 | Abu-Amara ............. 370/338 |

FOREIGN PATENT DOCUMENTS

| JP | 2008305371 A | * 12/2008 |
| WO | WO-2006043784 | 4/2006 |

OTHER PUBLICATIONS

"Digital Keystone Overview", Jan. 24, 2006.
"Digital Receiver Interface Protocol Specification OC-SP-DRI-I01-060109", Jan. 9, 2006.
"OpenCable Unidirectional Receiver OC-SP-OCUR-I01-060109", Jan. 9, 2006.
Candelore, Brian, "DRM to DRM Transcription through External Module", Mar. 7, 2006.

* cited by examiner

*Primary Examiner*—Pierre E Elisca
(74) *Attorney, Agent, or Firm*—Fitch, Even, Tabin & Flannery

(57) ABSTRACT

The present embodiments provide methods, apparatuses, and systems to distribute content over a network. Some embodiments provide methods to distribute content within a local media network. These methods receive a request for a first content to be transferred to a sink device, request from the source an access criteria for a first content that is protected according to a first digital rights management (DRM), forward the access criteria to the sink device, receive an evaluation of the access criteria from the sink device regarding at least whether the sink device can interpret the first DRM, determine according to the evaluation received from the sink device whether the sink device can utilize the first content that is protected according to the first DRM, and initiate a transfer of the first content from the source device to the sink device when the sink device can utilize the first content.

8 Claims, 7 Drawing Sheets

SYSTEMS AND METHODS TO DISTRIBUTE CONTENT OVER A NETWORK

FIELD OF THE INVENTION

The present invention relates generally to the distribution of content, and more particularly to the distribution of protected content over a network.

BACKGROUND

Large amounts of content, which can include data, information, statistics, multimedia (e.g., audio, video, still images, and the like) and other such content, can be stored in digital form in digital storage or memory and later retrieved from the memory. As the amount of content continues to grow it has become desirable to be able to forward content from one device to a second device.

Often, however, the content can be important and/or protected. For example, in some instances the rights to the content may be owned or controlled by an entity other than a user and the user is granted limited rights to access or utilize the content. Further, the protections applied to some content can make distributing the content difficult.

SUMMARY OF THE EMBODIMENTS

The present invention advantageously addresses the needs above as well as other needs through the provision of the methods, apparatuses, and systems for use in distributing content over a network. Some embodiments provide methods to distribute content within a local media network. These methods receive a request for a first content to be transferred to a sink device; request from the source an access criteria for a first content that is protected according to a first digital rights management (DRM); forward the access criteria to the sink device; receive an evaluation of the access criteria from the sink device regarding at least whether the sink device can interpret the first DRM; determine according to the evaluation received from the sink device whether the sink device can utilize the first content that is protected according to the first DRM; and initiate a transfer of the first content from the source device to the sink device when the sink device can utilize the first content.

Other embodiments provide methods to distribute content over a local network. These methods obtain an access criteria associated with a content protected by a first digital rights management (DRM) system; forward the access criteria to a sink device that utilizes a second DRM system; receive from the sink device a first evaluation of the access criteria; determine based on the first evaluation whether the first DRM is compatible with the second DRM; and direct the content to the sink device when it is determined that the first DRM is compatible with the second DRM.

Still other embodiments provide systems to distribute content over a network. These systems comprise: a content source that stores content protected according to a first digital rights management (DRM); a sink device that operates according to a second DRM; and a stream manager communicationally coupled with the content source and the sink device, wherein the stream manager retrieves access criteria for the content from the content source and forwards the access criteria to the sink device, receives a first evaluation of the access criteria from the sink device, determines based on the first evaluation whether the sink device can utilize the content protected according to the first DRM and initiates a transfer of the content to the sink device when the sink device can utilize the content protected according to the first DRM.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Figure 1:
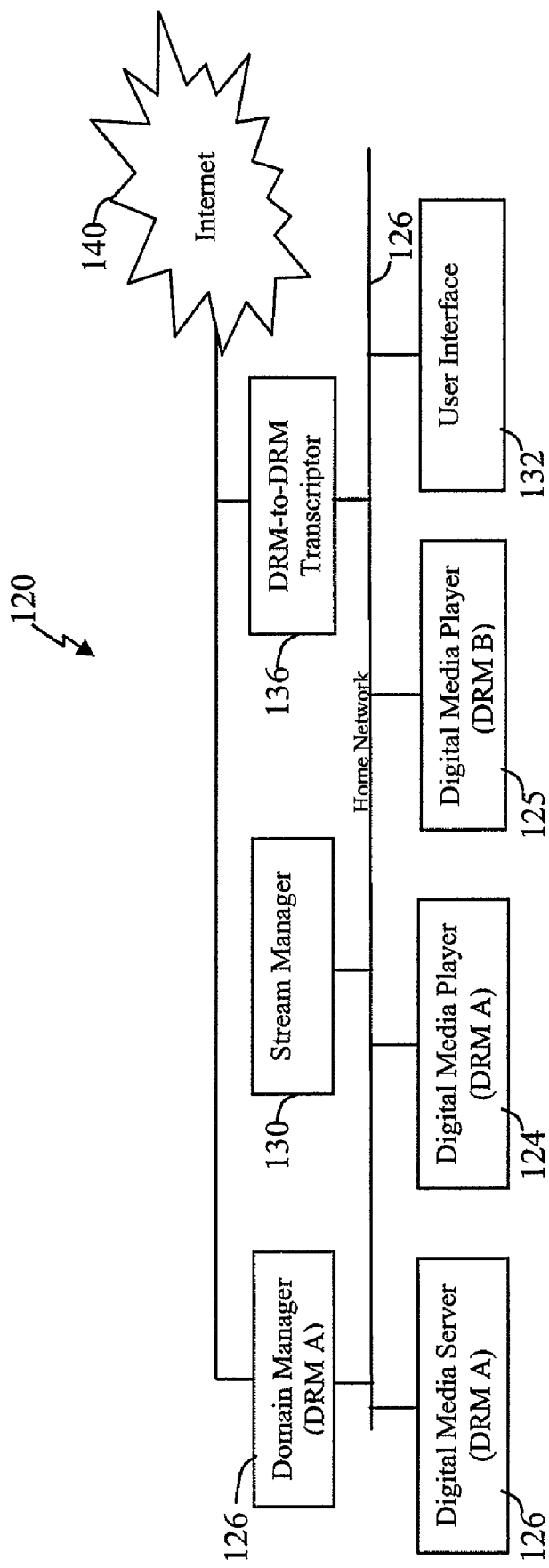
FIG. 1 depicts a simplified block diagram of a system or network according to some embodiments that allows access to and/or distribution of content.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide systems, apparatuses and methods to utilize and/or access desired content. The content can be substantially any content, such as but not limited to multimedia, audio, video, still images, textual, graphical images, graphics, and/or substantially any other relevant content. FIG. 1 depicts a simplified block diagram of a system or network 120 according to some embodiments that allows access to and/or distribution of content. In some implementations the network 120 is a local network, such as a home network or other relevant local network. The network 120 includes one or more content sources or media servers 122, one or more media players 124-125 (or other relevant devices for accessing content), a domain manager 126, a streaming manager 130, a user interface 132 and a communication link or system bus 134. The bus 134 couples system components including, but not limited to, the media server 122 to the media player 124 to allow content stored on the media server to be accessed by one or more media players when authorized. Some embodiments optionally include a digital rights management (DRM) to digital rights management converter, translator or transcriptor 136 (DRM-to-DRM transcriptor) that may provide rights transcription. Still further, one or more components of the network 120 can couple with one or more distributed networks 140, such as the Internet or other distributed network.

The media server 122 can be substantially any component capable of storing content and allowing that content to be retrieved and/or copied. In some embodiments, the media server is a device having relatively large digital memory to store content. For example, the media server can be a computer, laptop, Sony VAIO™, television (TV), jukebox, set-top-box and/or other relevant devices. Further, the media server can be a single or multiprocessor computing systems, microprocessor systems, minicomputers, server computers, portable or hand held devices, and/or other such devices. As described farther below, the media server can further implement and/or adhere to protection applied to content stored on the media server. The memory can be substantially any relevant computer storage medium, such as RAM, ROM, EEPROM, flash memory, optical storage (e.g., digital video disk (DVD), compact disc (CD) and the like), magnetic storage and/or other relevant computer readable medium.

The media players 124, 125 can be separate devices or part of other devices. In some implementations, the media player can be an application implemented through a computer or laptop. Additionally or alternatively, the media player can be implemented on device that also operates as a media server 122. Similar to the media server, computer, laptop, Sony VAIO™, TV, jukebox, set-top-box, a Sony Playstation Portable™ (PSP™), video iPOD™, cell phone, personal digital assistant and/or other such relevant devices and/or combinations of devices. Further, the media player can include a processor or controller and memory to store programs and/or applications to allow communication over the local network 134 with other components of the network and to allow a user to access content, such as but not limited to displaying still images, playing back video content, playing back music content and/or other access to desired content. The controller can be implemented through a single or multiprocessor computing systems, microprocessor systems, minicomputers, server computers and/or other relevant controllers. The memory can be similar to the memory of the media server 122. The media player typically also includes a user interface 132 that allows a user to access or playback content and to control the access and/or playback. The user interface and include a display, audio output, input devices (e.g., keyboard, mouse, stylist or other pointing device, buttons and the like).

The user interface 132 can be part of one or more of the other components of the network 120, such as part of the media server (e.g., the display, audio output, video card or circuitry, keyboard, mouse and other such components of a computer) or media player. Additionally or alternatively, the user interface 132 can be a separate user interface with a display, audio output, keyboard, mouse, touch screen and/or other such interfaces.

The stream manager 130 can be a separate component of the network 120 or be implemented in or more of the other components of the network. For example, in some implementations, the stream manager can be implemented on the media server 122. The stream manager 130 similarly employs and/or includes a processor and memory to store code and/or applications. The process and/or memory can be similar to those described above.

The network 120 in part allows users to access content through the one or more media players 124-125. Content owners, developers, distributors and creators often employ protection techniques to restrict or limit access and/or use of the content. The protection in part can attempt to limit unauthorized distribution of the content, restrict when and/or how the content can be used, whether copies can be made and/or other such protection. Further, the protection in some instances is implemented in attempts to provide a revenue stream to the content owners, developer, distributor and/or creator, for example, by restricting access to those that have paid for rights to access or use the content.

Digital Rights Management (DRM) is a general term that refers to different types and/or technologies used by content distributors, developers, creators, publishers and/or owners to control access to and usage of digital data, content or hardware, and to restrictions associated with instances of digital works or devices. A DRM can include copy protection and technical protection measures that can provide technologies that control or restrict the use and access of digital content on electronic devices with such technologies installed, acting as components of a DRM. There are many different types of DRM protection and/or systems that provide protection. Often these different types of DRM are not compatible and devices that operate according to a first DRM may not be capable of utilizing content protected according to a second DRM. As a result, in some instances a media player 124 may be unable to provide access to desired content from the media server 122 due to an incompatibility between the DRM technologies available through the media player and the DRM protections applied to the content.

In some embodiments, the stream manager 130 attempts to coordinate or facilitate the transfer of content over the network 120 between components of the network. In part, the streaming manager can attempt to identify whether a device attempting to access or receive content (a sink device) is capable and/or authorized to accurately use and/or playback content from a content source device. Further in some implementations the stream manager identifies content available on the network or system 120, for example, using Universal Plug and Play (UPnP) protocols, notification by media servers 122 and/or players 124, 125, and/or other such methods of identifying the available content.

Additionally, the stream manager 130 can provide this information to the user interface 132 and/or other interface (e.g., a user interface of one of the components of the network) to be displayed and/or rendered. The content choices displayed may not necessarily conform to the authorized domains in the network and/or of the media player 124. For example, there may be non-protected content, e.g., home movies, digital photographs, music, and documents that are not protected available on one or more media servers 122, and other content may be protected based on other DRM technologies that are incompatible with one or more of the media players. The stream manager, in some embodiments, can attempt to identify or distinguish content protected by one DRM system over another DRM system, for example, by labeling the content in the listing and/or incorporating a distinguishing indicator on an icon representation in the user interface 132. For example, content that is Microsoft Windows Media DRM (MS-WMDRM) protected can be identified by a displayed icon that includes a small Window logo with a lock, while content protected based on a Marlin DRM system could identified by a displayed icon with a small fish logo with a lock. Other such indications and/or distinctions can be displayed. For example, a listing of content can be displayed that is organized according to DRM protections, the listing can identify a DRM protection and/or other such indications. When the user attempts to access content protected using a particular DRM system or technology, the stream manager can alert the user to possible problems, such as but not limited to incompatibilities, domain and access rights issues, and/or other such problems as described fully below.

The stream manager 130 can communicate with components of the network 120 and provide information to the user, for example, through the user interface 132 or other interface of a component of the network (e.g., through a user interface of the media server or a media player). In various embodiments, the stream manager, however, does not perform an analysis of DRM technologies and/or the compatibility of DRM technologies between components of the network. The stream manager coordinates communication between components and relies on the components to perform evaluations. Based on the evaluations the stream manager 130 can provide feedback and/or information to the user regarding the accessibility, compatibility and/or interoperability of content and player. To configure the stream manager with the capabilities of evaluating DRM technologies the stream manager would include detailed knowledge of the intricate proprietary details of multiple DRM systems and/or technologies.

The domain manager 126 registers devices to be part of an authorized domain in the network 120. As part of the authorized domain, registered devices gain privileges, such as access to shared content. The domain manager can be implemented on a media server (e.g., a computer or music jukebox) or implemented as a separate device. Other components of the network 120 may also have a domain manager, where typically the user would choose which device (and domain manager) controls the authorized domain. Alternatively or additionally, a first domain manager that is present and/or activated on the network 120 can take and maintain control of the authorized domain. Registration of a component or device (e.g., a media player 124) typically counts towards a total number of devices that the authorized domain allows within that domain. Registration may entail proximity detection and/or some user interaction (e.g., acknowledgement that the user wants a particular device attached to the authorized domain).

Further, the registration can also involve a central DRM authority such that when the domain manager 126 is coupled with the distributed network 140 a shared user or family access or key for the network 120 is retrieved or downloaded for a new device to add the new device as a registered device to the authorized domain. The registered devices in a domain may be able to share content using a shared user or family key that is delivered, typically, using proprietary DRM techniques to devices of the domain and/or network when such distribution is allowed by the DRM. Additionally, some embodiments employ user acknowledgements that can attempt to limit unintentional additions of devices to the domain (e.g., prevent someone passing near a network that employs wireless communication that may be able to wirelessly access the network 120 from accessing the contents in the network 120). The user acknowledgement can include a user pressing a button on a particular device at a certain time during the registration process, inputting a registration code that might be found on a label mounted on the device being registered, or other proactive method to confirm acknowledgement (e.g., responding to a prompt or on screen display in the user interface 132).

The domain manager, in some embodiments, can prevent a device from being added to a domain when that device does not comply with and/or cannot utilize a given DRM scheme or system. Additionally or alternatively, in some implementations a device attempting to join and/or access a domain may not support a DRM of the domain, but can support a secondary, intermediate or default DRM or link encryption technology such as Digital Transmission Copy Protection (DTCP) over IP (Internet Protocol), often referred to as DTCP_IP. When one or more source devices of the authorized domain can support the default DRM or link encryption technology, content may be supplied to the device using this default scheme. Employing DTCP_IP as the intermediate or default protection scheme or part of the scheme may, in some embodiments, allow content to be streamed. Often such streamed content can be played back through the media player 124 but typically cannot be record at the player. This type of protection can allow a "render and trash" application where content can be displayed or listened to but with no persistent copies made. This type of output from the source device typically is implemented under the control or direction of the DRM system and/or scheme that protects the content.

In some implementations, the domain manager 126 is able to manage multiple authorized domains on the network 120. This ability may be limited by the DRM system(s) and/or technologies to control how many authorized domains a device can participate in, if more than one. For example, a TV might belong to a relatively static authorized domain with a set-top box, a DVD player and the like. When a visitor or new device accesses the network 120 (for example, a Sony Playstation Portable™ (PSP™), video iPOD™ and/or other such device) a new authorized domain may be established between just the TV and the PSP. In this configuration the TV would belong to two different authorized domains at the same time.

The distribution of content, as described above, can be limited and/or restricted due to DRM technologies and/or other protections applied to the network domain and/or the content within the network. The stream manager 130 attempts to facilitate the communication of content between components of the network 120.

Figure 2:
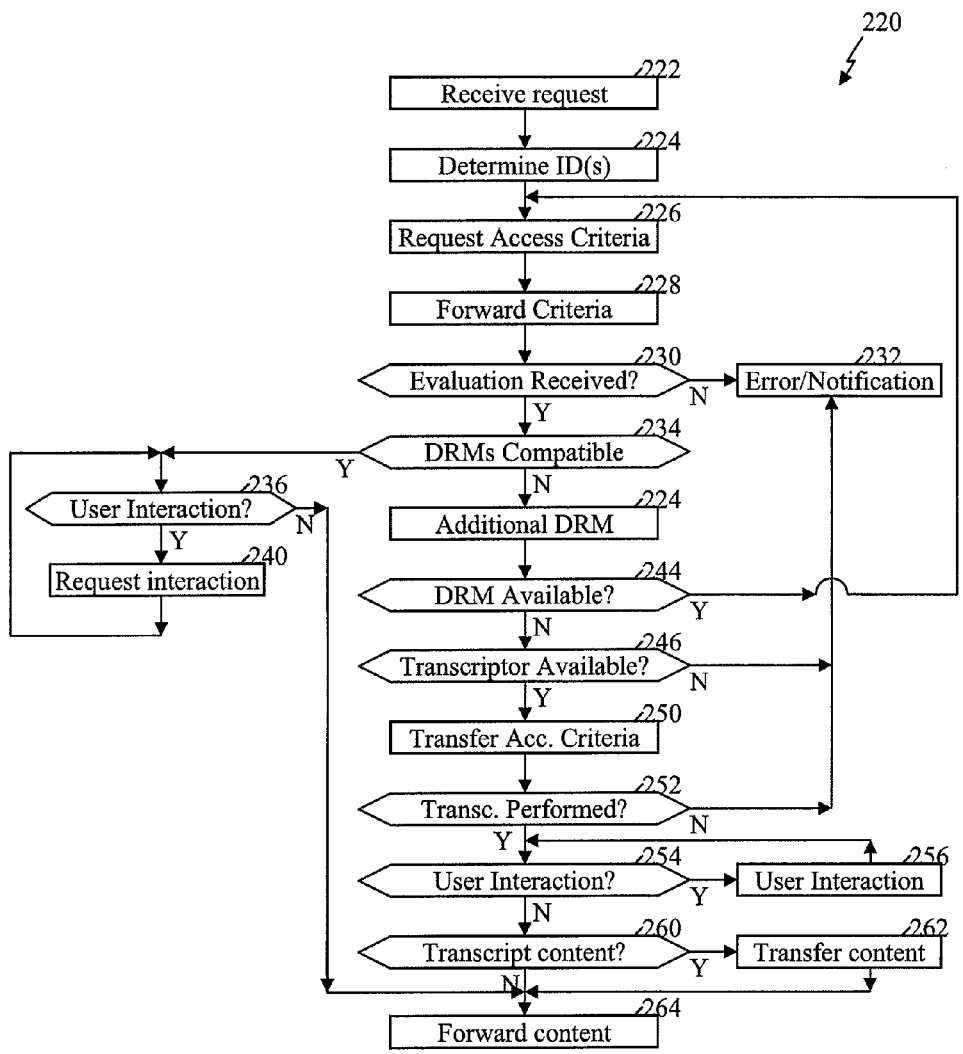
FIG. 2 depicts a simplified flow diagram of a process implemented by a stream manager in facilitating and/or coordinating the distribution of content over the network of FIG. 1.

FIG. 2 depicts a simplified flow diagram of a process 220 implemented by the stream manager 130 in facilitating and/or coordinating the distribution of content over the network 120 according to some embodiments. For example, a user attempts to copy content from a source device, such as the media server 122 (e.g., a Sony VAIO), to a sink device, such as a media player 124 (e.g., a portable PSP). The request to copy the content is conveyed by the user through the user interface 132. As introduced above, the user interface may be the interface of the media player, the media server or a separate user interface. In some embodiments, the request is received by the stream manager 130.

In step 222, a request is received from the user interface and/or the sink device (e.g., a media player 124) to transfer content from the source device (e.g., media server 122) to the media player. The request may define a command, identify desired content, provide an identification of the sink device, and in some instances may further identify the source device (e.g., the request may include [Operation=Copy][Content ID] [Data=Device ID sink][Data=Device ID source]). In step 224, an identification of the sink device, an identification of the requested content and an identification of source for the content is determined. This determination can include requesting an identification, extracting one or more of the identifications from the request, issuing one or more requests to the requesting device and/or potential source devices and/ or other such methods. In many instances, the request is implemented by a user accessing a listing of content and selecting content to be copied or moved to the sink device, and thus the identifications of the source device, sink device and content are readily available.

In step 226, the stream manager requests access criteria from the media server 122. The access criteria is associated with the requested content and at least in part identifies protection techniques applied to the content. For example, the access criteria can identify one or more DRM technologies applicable to the content. As a further example, the access criteria may detail that a media player has a DRM of a particular type (e.g., Fairplay, Windows Media DRM, Marlin and/or other such DRM), has a specific version (e.g., version 5) or has a version within a range (e.g., between versions 3-10), and satisfies conditions (e.g., having a current subscription monthly key, able to perform secure time operations for pay-per-time rental of 24 hours, be from a particular authorized domain, and/or other such conditions). The stream manager 130 typically does not evaluate the access criteria. Rather, it delivers the access criteria to the sink device (e.g., media player 124) for evaluation. The media player determines whether it can interpret the access criteria and whether it belongs to the proper domain, has the appropriate rights, password(s), key(s) and/or conditions to access the content. Typically, because the content is protected by the DRM (e.g., encrypted with one or more specific keys and/or algorithms), even if the sink device is not compliant and receives the content that it is not authorized for, it would be unable to utilized and/or render the content. Further, in many instances the sink device obeys the compliance and robustness rules for the DRM as determined when added to an authorized domain, should the sink device receive content it would not be able to render content for which it gets improper access.

Further in some embodiments, the access criteria define access rights and/or limitations, which often are part of the DRM protection and/or restrictions. These rights can define one or more authorized domain IDs, subscription, time-based or pay-per models, copy protection technology (which may allow streaming or secure moves operations), whether content can be copied, a number of times the content can be copied, a duration of time during which the content can be accessed, a number of times the content can be accessed, whether payment is to be made to gain access to the content, whether additional user interaction is needed prior to allowing access, authorized domains, whether content can be provided according to a default or intermediate protection scheme (e.g., content providing according to DTCP_IP), and/or substantially any other relevant rights and/or restrictions or combinations of rights and/or restrictions. Typically, the access criteria can be protected according to the same DRM that is applied to the content. The access criteria can be processed in order to properly calculate or derive the content key. A properly functioning DRM client interprets the access criteria and obeys restrictions and limitations.

Similar to the request from the user interface and/or sink device, the request to the media server 122 or other source device can define a command, identify desired content, identify what is being requested, such as requesting an identification of a DRM of the source device, the access criteria and/or other requested information or content (e.g., the request may include [Operation=Get][Content ID][Object ID=DRM ID source][Object ID=Access Criteria]). The response received at the stream manager can define a command or action, identify the desired content, and provide the requested information and/or content, such as the request DRM identification of the source device and the access criteria (e.g., the response may include [Operation=Send][Content ID][Data=DRM ID source][Data=Access Criteria]).

Still referring to FIG. 2, in step 228, the access criteria and/or other retrieved information is forwarded to the media player 124. In forwarding the retrieved information, the response may be substantially the same as the response from the media server (e.g., [Operation=Send][Content ID] [Data=DRM ID source][Data=Access Criteria]). In step 230, the stream manager 130 determines whether an evaluation is received from the media player. In some embodiments, the media server receives and/or requests the evaluation (e.g., [Operation=Get][data=Content ID][Data=DRM ID source] [Data=Access Criteria][Object ID=Interpretation]). As introduced above, the stream manager typically does not evaluate the access criteria in attempts to determine whether the source DRM is compatible with the DRM of the sink device. Alternatively, the stream manager awaits a reply from the sink device (e.g., media player 124) that performs the evaluation, thus, simplifying the stream manager. The sink device evaluates the access criteria to determine whether the sink device can accurately receive and access the content. This can include determining whether the DRMs of the content and the media player are compatible, whether rights are current and/or other such evaluations as described above and further below. When no response is received from the sink device the process 220 continues to step 232 where an error is generated and/or the user is notified through the user interface 132.

Step 234 is entered when an evaluation is received from the media player where a determination is made based on the received evaluation whether a DRM system of the media player 124 is compatible and/or interoperable with the DRM system of the source device and/or protection applied to the content, and/or whether the media player 124 can utilize the requested content protected and/or formatted according to a first DRM. For example, the evaluation returned to the stream manager 130 from the media player 124 can be one of: DRM is unknown or not compatible; DRM is compatible and a copy can be made but may not be playable; DRM is compatible and content can be moved from the present location (e.g., indicating source copy has to be deleted); DRM is compatible and content can be copied and played; DRM is compatible but may only be streamed from the present location; DRM is compatible but the device is not in one of the authorized domains listed in the access criteria; DRM is compatible but content has expired; DRM is compatible but content has no more plays; DRM is compatible and content can be copied and content has a fixed number of plays remaining (e.g., content can be played back one more time); DRM is compatible and content can be copied and has limited during which that content can be play; DRM is compatible but content may be copied and played with user intervention (e.g., payment, license acknowledgement, sink acknowledgement making the copy count as a "copy," sink device registration acknowledgement for authorized domain and/or other such user intervention); and/or other such relevant evaluation responses. In some embodiments, the evaluation responses can include predefined codes that are known by and/or defined at the stream manager to accurately interpret the evaluation performed at the sink device (e.g., media player). The media player forwards the evaluation and/or responds to the request for the evaluation (e.g., [Operation=Send][Content ID] [Data=DRM ID sink][Data=Interpretation]).

Still referring to FIG. 2, in those instances where it is determined in step 234 that the media player cannot utilized the content according to the current DRM applied by the media server the process 220 skips to step 242. Alternatively, when it is determined that the media player can utilized the content step 236 is entered to determine whether additional user interaction is needed before the first content can be forwarded to and/or accessed at the media player. As introduced above, the user interaction can include one or more actions to gain access, such as acknowledging a copy or move of content, paying for rights, accepting a license, adding the media player to the authorized domain and/or other such actions. The process skips to step 264 to implement the transfer of the requested content when further user interaction is not needed. Alternatively, when further user interaction is needed step 240 is entered to request the user interaction. In some embodiments, step 240 is implemented by a process 320 as described below with reference to FIG. 3. Following step 240 and once user interaction as been satisfied, the process 220 returns to step 236 to determine whether further user interaction is needed (e.g., a first user interaction was needed to incorporate the media player into the authorized domain, and a subsequent user interaction is needed to pay for access to the content).

In some embodiments, the process 220 includes optional steps 242 and 244 where the stream manager attempts to identify one or more additional or alternative DRM schemes that can be utilized by the media player and queries the source media server 122 to determine whether the media server can accommodate the additional or alternative DRM scheme. For example, there may be a "one off" solution between the media server and the media player, such as where MS-WMDRM and Marlin DRM can utilize and/or access the OMA DRM, while MS-WMDRM is not compatible with Marlin protected content, and vice versa. Often this additional or alternative DRM scheme information that can be provided by the media server is defined in the access criteria allowing the sink device to determine whether the additional or alternative DRM scheme(s) can be utilized by the sink device. In other instances, however, the additional or alternative DRM scheme information is not provided in the access criteria and the stream manager can query the media server in step 242 to request whether addition or alternative DRM schemes are available that can be utilized by the media player. In step 244 it is determined whether an additional or intermediate DRM is available. Further in some instances, the additional and/or alternative DRM scheme information is transcribed as described below before forwarding the query to the source device.

When additional or alternative DRM schemes are available, the process 220 returns to step 226 to retrieve access criteria that represents the additional or alternative DRM scheme(s). When it is determined in step 234 that the DRM is not compatible with the media player and/or when additional or alternative compatible DRMs are not available the process enters step 246 to determine whether a DRM-to-DRM transcriptor 136 is available on the network 120 and/or can be accessed over the distributed network 140. Some embodiments include a DRM-to-DRM transcriptor that is capable of transcripting and/or transcribing the access criteria and/or the content from a first DRM to a second DRM that may be compatible with a media player. The DRM-to-DRM transcriptor 136 can be a separate device of the network 120 or can be implemented through one or more components of the network, such as implemented on the media server 122. Further, in many embodiments, some or all of the transcription can be implemented through a remote device accessible over the distributed network 140. Alternatively or additionally, the DRM-to-DRM transcriptor 136 may communicate over the distributed network with one or more remote sources to acquire rights and/or parameters to implement the transcription. In some instances, the DRM-to-DRM transcriptor can employ Coral™ to provide some or all of the transcription.

Further in some embodiments, the DRM-to-DRM transcriptor can utilize a network connection to maintain DRM criteria, parameters, rules, rights, keys and the like up to date and current. By communicating with remote sources over the distributed network 140, the DRM-to-DRM transcriptor 136 can alter and/or upgrade the transcription capabilities of the DRM-to-DRM transcriptor.

In those instances where a DRM-to-DRM transcriptor is not available, an error is generated in step 232. When it is identified in step 246 that a DRM-to-DRM transcriptor is available step 250 is entered where at least the access criteria is transferred to the DRM-to-DRM transcriptor. In step 252, it is determined whether a transcription of the access criteria can be performed from the first DRM to a second DRM. This determination typically is based on a response from the DRM-to-DRM transcriptor 136. In some embodiments, the stream manager 130 submits a request to the DRM-to-DRM transcriptor 136 (e.g., [Operation=Get][data=Content ID] [Data=DRM ID sink][Data=DRM ID source][Data=Access Criteria][Object ID=Interpretation]), and following an evaluation the DRM-to-DRM transcriptor returns a reply (e.g., [Operation=Send][data=Content ID][Data=DRM ID source] [Data=DRM ID sink][Data=Interpretation]). For example, the response from the DRM-to-DRM transcriptor can include one or more of: Source DRM not supported; Source DRM is not up-to-date (Transcriptor problem); Target DRM not supported; Target DRM is not up-to-date (Transcriptor problem); Transcription supported and access criteria interpretation is included; Transcription supported and device credential interpretation is included; Transcription supported with a network connection and network connection is not attached (additional user interaction needed to connect); Transcription supported with user intervention, acknowledging payment to do transcription; Transcription supported with user intervention, acknowledging target DRM license agreement; and/or other such responses. The streaming manager can generate a notification to the user regarding the response from the DRM-to-DRM transcriptor. When a transcription can be preformed, the access criteria and/or content can be transcribed from a first DRM to a second DRM. In some embodiments, the DRM-to-DRM transcriptor not only provides a service to translate access criteria and rights from one DRM to another but also, optionally, may transcode content from one codec to another with re-encryption of the content. Additionally in some instances, the DRM-to-DRM transcriptor may further provide re-encryption of content when there is no codec change.

In order to manage transcoding according to some embodiments, the DRM-to-DRM transcriptor may be able to decode the source content and encode the target content. For example, the DRM-to-DRM transcriptor might decode content sent by a cable provider using MPEG2 and transcode it to MPEG4 Part 10 (also known as the Advanced Video Coded or AVC) for use by, for example, a Sony PSP. In order to accomplish this, the transcriptor in some implementations knows the screen size of the target player, e.g., in this case the Sony PSP. Transcoding is typically performed by decompressing the content with the source codec and then re-compressing the content with the target codec. After the content has been transcoded, the content could be re-encrypted for delivery to the target device. A key can be applied to scrambling the content. In some instances, the key could be the same as that applied to the content before transcoding.

When a transcription cannot be performed step 232 is entered where an error is generated and/or the user is notified that the sink DRM is incompatible with the source DRM and/or a transcription could not be performed. In step 254, it is determined whether further user interaction is needed to initiate and/or complete the transcription. The process skips to step 260 when further user interaction is not needed. Alternatively, step 256 is entered to initiate additional user interaction. In some embodiments, step 256 initiates a process 420 described below with reference to FIG. 4. Following step 256, the process returns to step 254 to determine whether user interaction is sufficient and/or whether user interaction could overcome the potential transcription problems and/or issues.

In step 260, it is determined whether the requested content additionally needs to be transcripted. In some instances, once the access criteria is transcripted, the media player can retrieve a password or keys and/or identify access rights to accurately utilize the content without further transcription of the content itself. When the content is to be transcripted the content is forwarded to the DRM-to-DRM transcriptor 136 in step 262. Alternatively, the process continues to step 264 where the content or the transcripted content is forwarded to the media player 124 to be accessed by the user according to the access rights and/or limitations.

Figure 3:
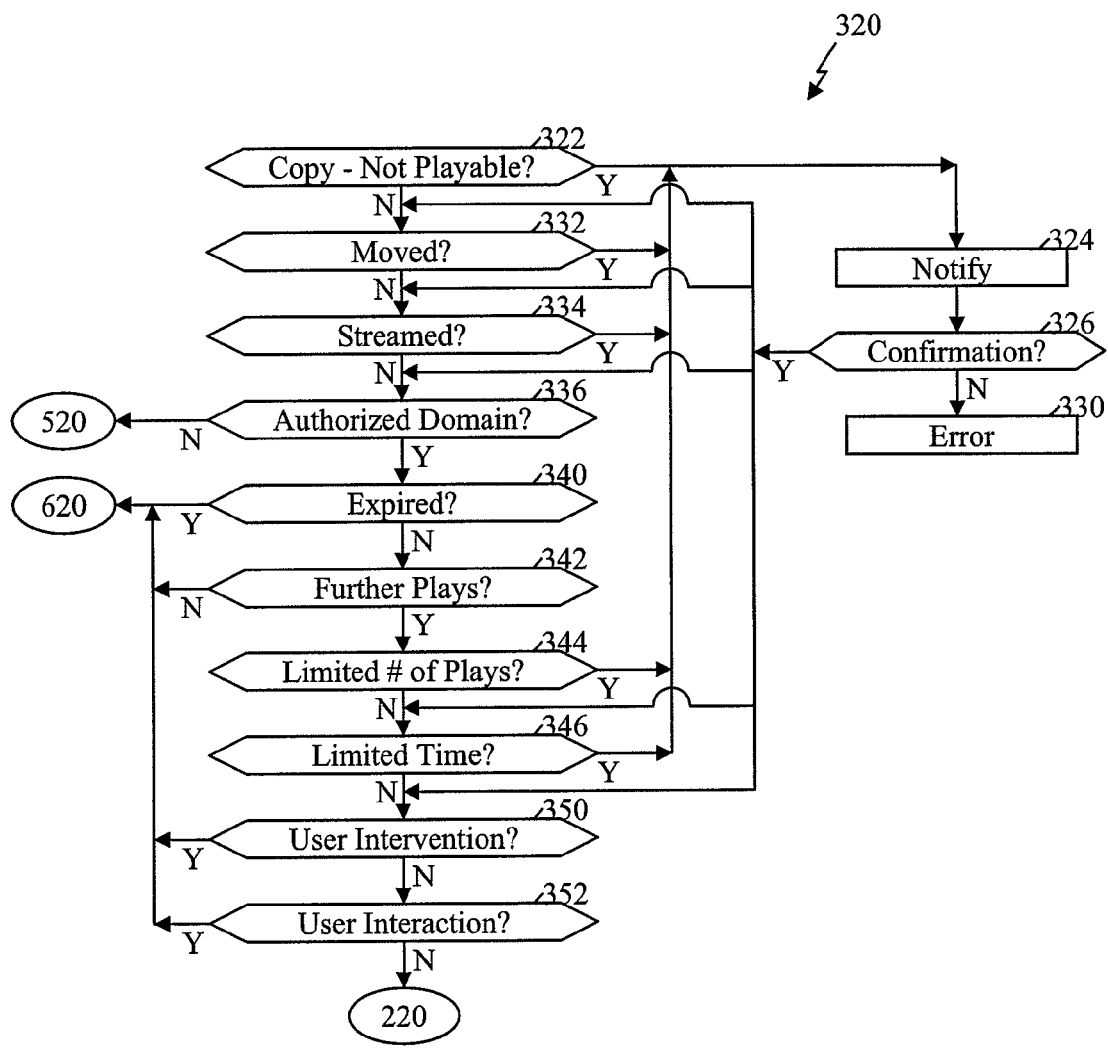
FIG. 3 depicts a simplified flow diagram of a process to obtain additional user interaction that may be needed before the requested content can be forwarded to and/or accessed at a sink device of the network of FIG. 1.

FIG. 3 depicts a simplified flow diagram of a process 320 to obtain additional user interaction that may be needed before the requested content can be forwarded to and/or accessed at the sink device (e.g., media player 124). The process 320 can be activated, for example, from one or both steps 236 and 240 of the process 220 of FIG. 2. As described above, the determination that further user interaction may be needed typically is based on evaluation results received from the media player. In step 322, a determination is made whether a copy of the content can be made but may not be playable. When a copy can be made but will not be playable, step 324 is entered where a notice is generated and displayed through the user interface 132 notifying the user that a copy can be made but will not be accessible, and requesting instructions regarding whether to initiate the copy. In step 326 it is determined whether a confirmation is received from the user (e.g., allow copy or cancel copy). When no response is received, an error is generated in step 330.

The process continues to step 332 to further determine whether the requested content has to be moved from the present location (e.g., the source copy of the content must be deleted at the media server 122 upon transfer of the content to the media player 124). In those instances where the source copy does have to be deleted, the process continues to steps 324 and 326 to generate a notification and determine whether a response is received. When a response is received in step 326 or when the source copy does not have to be deleted, the process continues to step 334 to determine whether content may only be streamed from the source location. Again, when the content can only be streamed, steps 324 and 326 are entered to notify the user and receive a response. When a response is received or the content does not have to only be streamed, the process continues to step 336.

In step 336, it is determined whether the media player 124 is designated as being in one of the authorized domains listed in the access criteria. In those instances where the media player is not identified as being part of an authorized domain, the process 320 activates an additional process 520 described below with reference to FIG. 5 that can attempt to add the media player to one of the authorized domains. For example, the stream manager 130 can initiate a request to the domain manager 126 requesting the device be added to the authorized domain (e.g., [Operation=Register][data=Device ID sink]), which in some embodiments can cause the activation of the process 520 described below. When the media player is identified as part of the authorized domain the process continues to step 340 to determine whether the content has expired. In those instances where the content has expired, some embodiments may enter step 330 where an error is generated. Additionally or alternatively, some embodiments activate an additional process 620 described below in reference to FIG. 6 in attempts to determine whether the content can be re-purchased and/or to renew the rights to the content.

In step 342 the process continues to determine whether content has authorized further plays. In those instances where no further plays are available, an error can be generated from step 330 and/or the process 620 can be activated in attempts to acquire rights to additional plays. Alternatively, the process continues to step 344 where it is determined whether the content can be copied and the content can only be played back a limited number of times. When the content can be copied and has a limited number of plays, steps 324 and 326 is entered to notify the user that the copy can be made and further notifying the user of the remaining number of plays available, and subsequently continues to step 346.

In step 346 it is determined whether content can be copied but has a limited time remaining during which the content can be accessed and/or played back (e.g., content can be accessed for four more hours or until, for example, 6:00 PM). The user is notified in step 324 when the content can be copied but is limited in the time remaining for playback. When confirmation is received to allow the coping in step 326 the process continues to step 350 to determine whether user intervention is needed prior to allowing content to be copied. When further user intervention (e.g., paying for rights to the content) is needed, step 330 can be entered to generate an error and/or the process 620 can be activated.

In step 352, it is determined whether other user intervention is needed (e.g., license acknowledgement; sink acknowledgement making the copy count as a "copy"; device registration acknowledgement for authorized domain) prior to allowing the content to be copied. In those instances where user interaction is needed, the process 620 can be initiated in attempts to acquire the user interaction. When no further user interaction is needed the process 320 returns to the process 220 of FIG. 2. It is noted that one or more of the steps of the process 320 can optionally be removed in those instances where the condition is not applicable. Similarly, additional or alternative steps can be added to address additional issues in accessing content.

As introduced above with regard to implementing a DRM-to-DRM transcription in step 254 additional user interaction may be needed before and/or in order for a transcription to be performed. For example, some content owners, distributors and/or other relevant parties may want payment before a transcription of their content is allowed, a user may be required to accept terms of a licensing agreement prior to allowing transcription, DRM transcription parameters, authorization and/or other relevant material may be needed to accurately perform the transcription, and other user interaction may be needed in order to implement and/or obtain authorization to perform a transcription from a first DRM to a second DRM. Often the user interaction is associated with accessing one or more remote sources and/or devices over the distributed network 140 to acquire authorization, make payments, agree to licensing issues, obtain information or parameters (e.g., latest version updates for a transcription process, a decryption key, password and/or the like).

Figure 4:
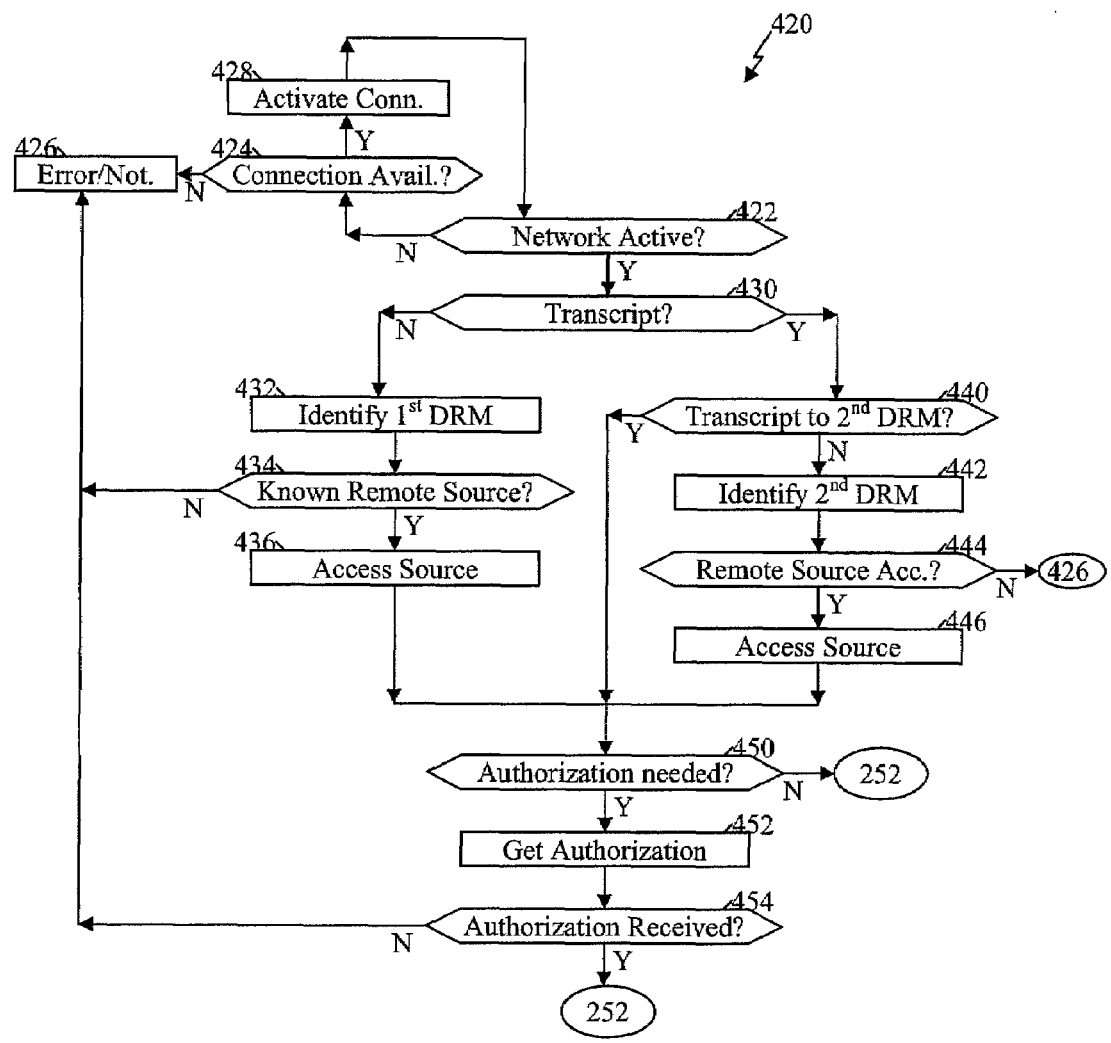
FIG. 4 depicts a simplified flow diagram of a process that can be implemented in some embodiments when user interaction is needed to initiate and/or complete a digital rights management to digital rights management (DRM-to-DRM) transcription.

FIG. 4 depicts a simplified flow diagram of a process 420 that can be implemented in some embodiments when user interaction is needed to initiate and/or complete a DRM-to-DRM transcription. The process 420 can, for example, be activated by step 256 of the process 220 of FIG. 2. In step 422, a network connection is check to determine whether it is active. The network connection allows the DRM-to-DRM transcriptor 136 to communicate with one or more remote devices coupled with the distributed network 140 to retrieve DRM parameters, authorization and/or other relevant information that can be utilized in performing a transcription. Additionally or alternatively, the network connection may be utilized to forward some or all of the access criteria and/or the content to a remote device to perform some or all of the transcription, potentially with transcoding when appropriate. In transferring the access criteria or content, some embodiments can employ additional protections, such as encryption prior to and/or during transmission. The network connection can additionally be utilized in some embodiments with some content to access a remote source, provide an identification of the content and a desired destination DRM and receive a copy of the content formatted in the destination DRM, where the remote source does not necessarily have to perform a transcription. When it is determined in step 422 that the network connection is active the process skips to step 430.

Alternatively, when the network connection is not active step 424 is entered to determine whether a network connection is available from the DRM-to-DRM transcriptor or other component of the network 120 when appropriate (e.g., the media server 122 can connect with the distributed network and forward access criteria and/or content in response to a request from the DRM-to-DRM transcriptor). The network connection can be substantially any type of connection, including wired or wireless connections with the distributed network 140. When a network connection is not available, some embodiments enter step 426 where an error and/or user notification is generated. Step 428 is implemented when a network connection is available such that a request is generated (e.g., through the user interface) requesting the network connection be established, for example, through an access point that can be discovered (e.g., discovered using UpNP protocols). The process then returns to step 422 to re-initiate an evaluation of user interaction.

In step 430, it is determined whether the DRM-to-DRM transcriptor 136 can accurately access, transcript or transcribe a source DRM that is applied to the access criteria and/or content attempting to be accessed. When the source DRM is accessible by the transcriptor 136, the process continues to step 440. Step 432 is entered when the source DRM cannot be accurately interpreted and/or accessed by the DRM-to-DRM transcriptor 136 where the source DRM that is applied to the access criteria and/or content attempting to be accessed is identified. This identification can include extracting an identification from the access criteria, a header content or communication to the DRM-to-DRM transcriptor, from metadata of the access criteria and/or content, determined based on a file extension and/or naming convention, and/or other methods of identifying the DRM. In step 434, it is determined whether a remote server or source associated with the source DRM is known that can be accessed over the network 140. When a source, such as an Internet site, is not known and/or cannot be determined an error is generated. Alternatively, when the source is known step 436 is entered and the source is accessed over the distributed network 140. The process then continues to step 450.

Similarly, in step 440, it is determined whether the DRM-to-DRM transcriptor 136 can accurately perform a transcription to a destination DRM that can be utilized by the sink device (e.g., media player 124). When a transcription can be performed the process continues to step 450. Alternatively, step 442 is entered where the destination DRM is identified. This identification can be based on a query of the media player 124, identified in a request for the content, identified in the evaluation of the access criteria and/or other relevant methods. In step 444, it is determined whether a remote server or source associated with the destination DRM is known that can be accessed over the network 140. When a source, such as an Internet site, is not known and/or cannot be determined an error is generated. Alternatively, when the source is known step 446 is entered and the source is accessed over the distributed network 140.

In step 450, it is determined whether authorization is needed prior to performing a local transcription through the DRM-to-DRM transcriptor from the source DRM to the sink or destination DRM. This authorization can be a restriction defined within the access criteria and/or applied by a source accessed over the network. For example, a source associated with the source DRM or the access criteria may require payment before providing access (e.g., a key) so that transcription can be performed. Additionally or alternatively, the access criteria and/or a source accessed over the network may want a user to accept a license, define further limitations on the content and/or use of the content (e.g., adding limitations to the access criteria, such as restricting a number of playbacks or other such limitations), and/or other such user interaction. When authorization and/or further user interaction is not needed the process returns to step 252 of the process 220 of FIG. 2.

Step 452 is entered when authorization is needed where a connection with a remote source is activated if not already activated to acquire the authorization. Typically, the user interacts with remote source to retrieve authorization, such as making a payment, acknowledging a license, and/or other such user interaction. In step 454, it is determined whether authorization is received. When authorization is not received an error is generated in step 426. Alternatively, the process returns to step 252 of the process 220 to further implement the DRM-to-DRM transcription.

Figure 5:
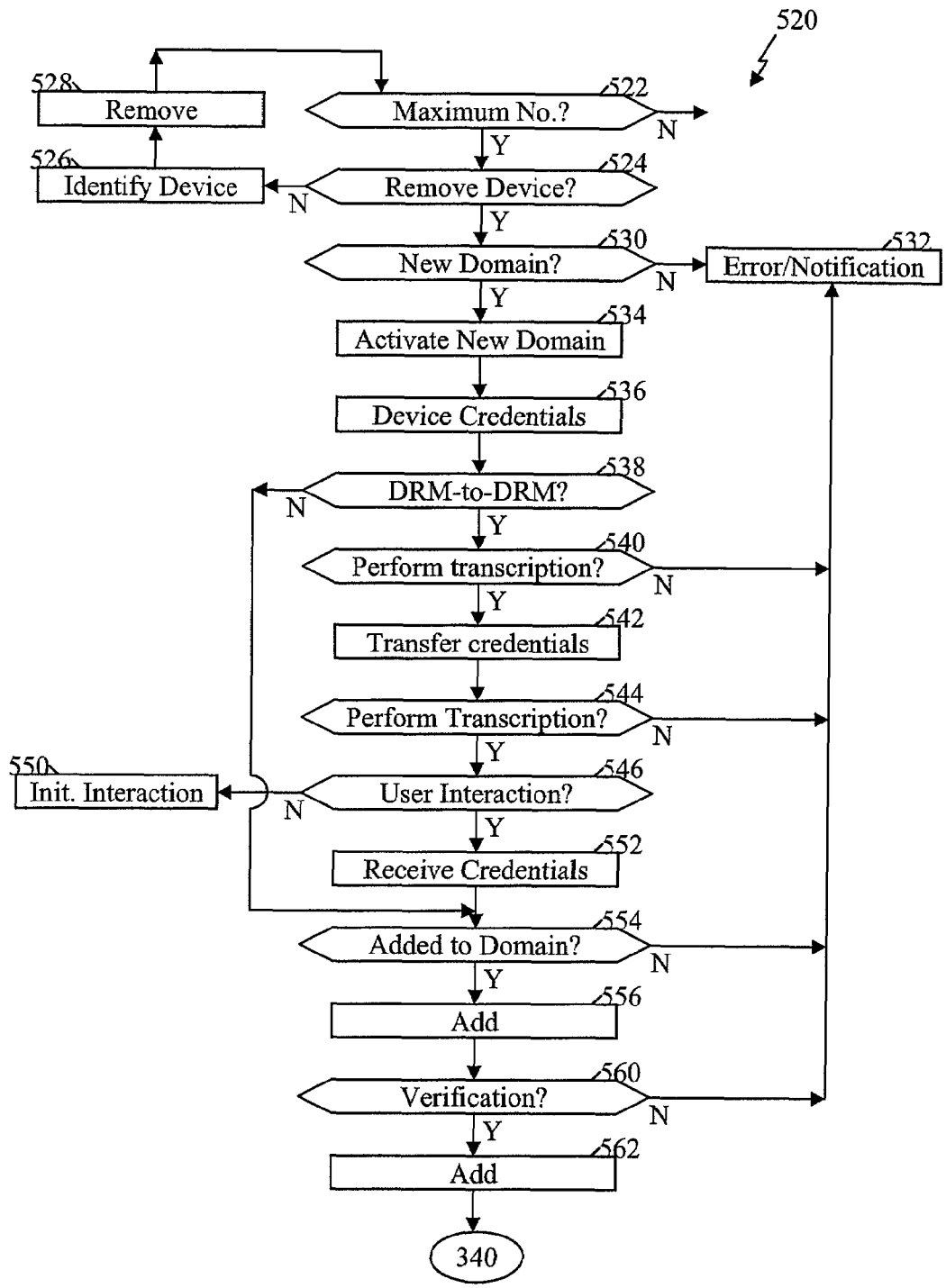
FIG. 5 depicts a simplified flow diagram of a process that attempts to determine whether a device of the local network of FIG. 1 can be added to an authorized domain of the local network and/or registering the device when applicable.

FIG. 5 depicts a simplified flow diagram of a process 520 that attempts to determine whether a device (e.g., a media player 124, 125) can be added to an authorized domain of a local network 120 and/or registering the device when applicable. In some instances, the process 520 is activated in response to step 336 when a media player or other device attempting to access content on the network 120 is not identified as being part of an authorized domain. In step 522, it is determined whether a maximum number of devices are already registered with the active domain on the network attempting to be accessed. As described above, some embodiments provide for multiple domains to be defined and/or active relative to a single local network 120. The process 520 may be repeated for additional domains and/or multiple domains can be evaluated during a single implementation of the process 520.

When less than a maximum number of devices are registered the process skips to step 536. Alternatively, when a maximum number of devices are registered for the domain, step 524 is entered to determine whether one or more devices can be removed from the authorized domain (e.g., a device may be removed from a domain through a shunning process, such as when a user or family key is being used with a domain, a new user or family key can be delivered to the devices in the domain except the device being removed or shunned). When a device can be removed the process continues to step 526 where one or more devices are identified to be removed from the domain and a notification is issued to the user in step 526 identifying the device that is to be removed and requesting confirmation, or a listing of potential devices can be displayed requesting a user to select a device. In step 528 the selection is received and the device is removed. The process 520 then returns to step 522 to further evaluate the domain. Typically, the removal of a device from the domain is implemented by the domain manager 126 of the network 120.

When it is determined in step 524 that a device cannot be removed the process 520 continues to step 530 to determine whether a new domain can be activated and/or has to be activated. In some instances, the services providers (e.g., cable, satellite, Telco, Internet) dictate or determine whether a new domain can or should be activated for content delivered from their networks. Further, in some implementations a domain may be required for each type of content. Service providers can define and/or limit domains, for example, to control and/or safeguard content that they deliver. In determining whether a new domain can be active, some DRM implementations can define a number of available concurrent domains that can be supported. When a new domain can be activated step 534 is entered where a new domain is activated. In those instances where a new domain cannot be activated, an error and/or a user notification is generated (e.g., displayed on the user interface 132) and/or forwarded from the domain manager 126 to the stream manager 130 and/or media player 124 in step 532 (e.g., Registration failure, number of devices exceeded).

In step 536, device credentials are requested and received from the device attempting to be added to the authorized domain (e.g., media player 124). These are DRM specific certificates are often loaded at the factory during assembly of the device. The device credentials can include similar information as defined within access criteria, such as one or more DRMs compatible and/or usable with the media player, limitations of the media player and/or other such information. In some instances, the device credentials are embodied in a certificate with various fields that describe the device (e.g., hard disk drive, real-time clock, separate dedicated crypto processor, network connection, AES support, and/or other such credentials and/or characteristics). The domain manager can, in some embodiments, request the device credentials from the stream manager 130 and/or the media player 124 (e.g., [Operation=get][data=Device ID sink][Object ID=DRM sink][Object ID=Device Credentials]), and the credentials are returned to the domain manager (e.g., [Operation=send][data=Device ID sink][Data=DRM sink] [Data=Device Credentials]). Typically, the domain manager 126 interprets the credentials and performs relevant evaluations and/or tests of the credentials (e.g., for proximity, determining a total number of domains that a device can participate in (if more than one), and/or other such evaluations). For example, if content has time expiration, the domain manager may enable only devices which have a real-time clock reflected in the device certificate. In step 538, it is determined whether the sink device credentials need to be transcribed or translated by the DRM-to-DRM transcriptor 136 prior to being used in the authorized domain and/or in registering with the domain. For example, there may be some public keys that may need to be accessed in the device credentials prior to transcription. Further in some instances, the protocol for the evaluation and/or testing by the domain manager may also need to be transcribed as well through the DRM-to-DRM transcriptor.

When no transcription is needed the process skips to step 554. Alternatively, step 540 is entered to determine whether DRM transcription can be performed and/or whether a DRM-to-DRM transcriptor is accessible on the network 120 and/or through the distributed network 140. In those instances where transcription cannot be performed the process continues to step 532 where an error and/or notification is generated. Alternatively, step 542 is entered to initiate a transfer of device credential to the DRM-to-DRM transcriptor 136 to perform transcription (e.g., [Operation=get][data=DRM source][data=DRM sink][data=Device ID sink] [data=Device Credentials][Object ID=Interpretation]). This transfer of credentials typically is from the media player 124. In some instances, however, the device credentials may be forwarded to the stream manager 130, the domain manager 126 or other relevant device of the network that forwards the credentials to the transcriptor when a transcription can be performed.

In step 544 it is determined whether a transcription of the device credentials can be performed from a first DRM to a second DRM. Similar to step 252 of the process 220, this determination typically is based on a response from the DRM-to-DRM transcriptor 136 (e.g., [Operation=Send] [Data=DRM ID source][Data=DRM ID sink [data=Device ID sink][Data=Credential Interpretation]). For example, the response from the DRM-to-DRM transcriptor can include, for example: Source DRM not supported; Source DRM is not up-to-date (Transcriptor problem); Target DRM not supported; Target DRM is not up-to-date (Transcriptor problem); Transcription supported and access criteria interpretation is included; Transcription supported and device credential interpretation is included; Transcription supported with a network connection and network connection is not attached (additional user interaction needed to connect); Transcription supported with user intervention, acknowledging payment to do transcription; Transcription supported with user intervention, acknowledging target DRM license agreement; and/or other such responses.

When a transcription cannot be performed step 532 is entered where an error is generated and/or the user is notified of the incompatibility of the player device and the authorized domain (e.g., Registration failure, sink DRM is not compatible). Alternatively, when transcription can be performed, it is determined in step 546 whether further user interaction is needed to initiate and/or complete the transcription. When further user interaction is not needed the process skips to step 552. Alternatively, in step 550 additional user interaction is initiated. In some embodiments, step 550 initiates the process 420 described above with reference to FIG. 4. Following step 550, the process returns to step 546 to determine whether user interaction is sufficient and/or whether user interaction could overcome the potential transcription problems and/or issues.

In step 552, transcribed device credentials are received. The process continues to step 554 to determine whether the media player or other device can be added to the authorized domain. This determination is based on the criteria of the device, such as whether the device is compatible, whether the domain allows such a device and/or other such determinations. For example, the determination may be made based on devices may have various levels of security, a domain manager wanting an ultra-secure network may wish to only add devices that have a dedicated cryptographic processor to handle keys, adding only devices that have a real-time clock, and/or other such factors. When the device cannot be added to the domain an error and/or notification is generated in step 532. Alternatively, in step 556 the domain manager 126 initiates the addition of the device to the authorized domain. In step 560, the domain manager requests user verification and/or authentication to add the device to the authorized domain and determines whether verification is received. This authorization and/or verification can provide added security to the network and/or domain so that devices passing by the network or within a wireless range of the network cannot be added without user authorization. When verification is denied and/or no verification is received an error and/or notification can be generated in step 532 (e.g., registration failure, proximity failure). In step 562, the device is added to the domain following the receipt of the authorization. Additionally in some instances, the domain manager confirms the registration sending a registration successful notice (e.g., [Operation=Register Confirmation][data=Device ID sink]). The process 520, in some embodiments, can then return to step 340 of the process 320 of FIG. 3.

Figure 6:
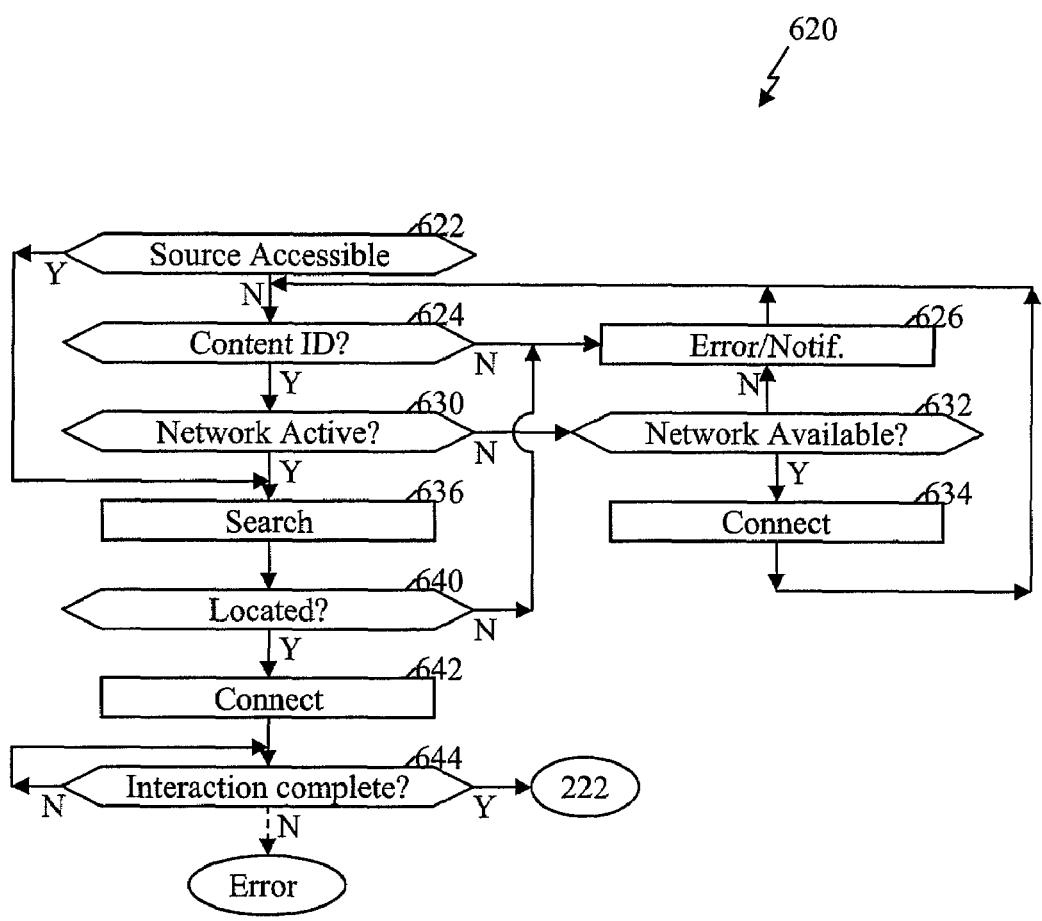
FIG. 6 depicts a simplified flow diagram of a process that can be activated in attempts obtain rights and/or authorization to content.

FIG. 6 depicts a simplified flow diagram of a process 620 that can be activated in attempts obtain rights and/or authorization to content. As introduced above, some embodiments activate the process 620 when it is identified (e.g., in step 340) that content has expired, that no further plays are available (e.g., step 342), that user intervention is needed prior to allowing content to be copied (e.g., steps 350 and 352), and/or other such user interaction to obtain rights and/or authorization.

In step 622, it is determined whether a content owner, source and/or authorizing party can be identified and/or is accessible over the distributed network 140 (e.g., extracting a URL, searching the Internet and/or the like). When the content owner or authorizing party can be access the process skips to 636. Alternatively, step 624 is entered to determine whether a content identification is known or can be determined. In those instances where a content identification is not known or cannot be determined, an error and/or user notification is generated in step 626.

In step 630, it is determined whether a network connection is active. When the connection is active the process continues to step 636. In those instances where the connection is not active step 632 is entered to determine whether a network connection is available. When a connection is not available the process continues to step 626 to generate an error and/or notification. In step 634 a request to connect to the network is issued and the process returns to step 624.

A search is implemented in step 636 over the network 140 for the content owner, source or authorizing party, or search based on content identification is initiated in attempts to identify the content owner and/or authorizing party. In step 640 the search results are evaluated to determine whether the content owner and/or authorizing party is located (e.g., whether an Internet site hosted by an authorizing party is located). When the search is unsuccessful, an error and/or notification can be generated in step 626. Alternatively, a connection is established with the content owner and/or authorizing party in step 642. In step 644 it is determined whether user interaction with the content owner and/or authorizing party is complete (e.g., interactions of the user with a remote Internet site to make a payment, to accept a license and/or other actions). When the user interaction is complete the process returns to step 222 of the process 220 of FIG. 2. Alternatively, the process returns to step 644 to await completion, or an error and user notification are generated. In some embodiments, a time period is monitored and if a response is not received within the time period the error is generated. Additionally a user can terminate a connection with a remote source and/or authorizing site prior to authorization being received, which can trigger step 626 and the generation of an error and/or notification.

The DRM-to-DRM transcriptor 136 can be implemented as a logical entity and located, for example on the same execution platform as the domain manager 126, stream manager 130 and/or the media server 122 (for example, on a personal computer with a network connection). The DRM-to-DRM transcriptor might alternatively be implemented in the network 120 as a separate security hardened physical module that can, for example, implement a content decryption, making it clear and then re-encrypted while maintaining security of the key(s) and/or content. The security hardened module maintains the clear key and clear content inside the module housing or security ASIC to provide protection at least while the key and/or content are in the clear.

Figure 7:
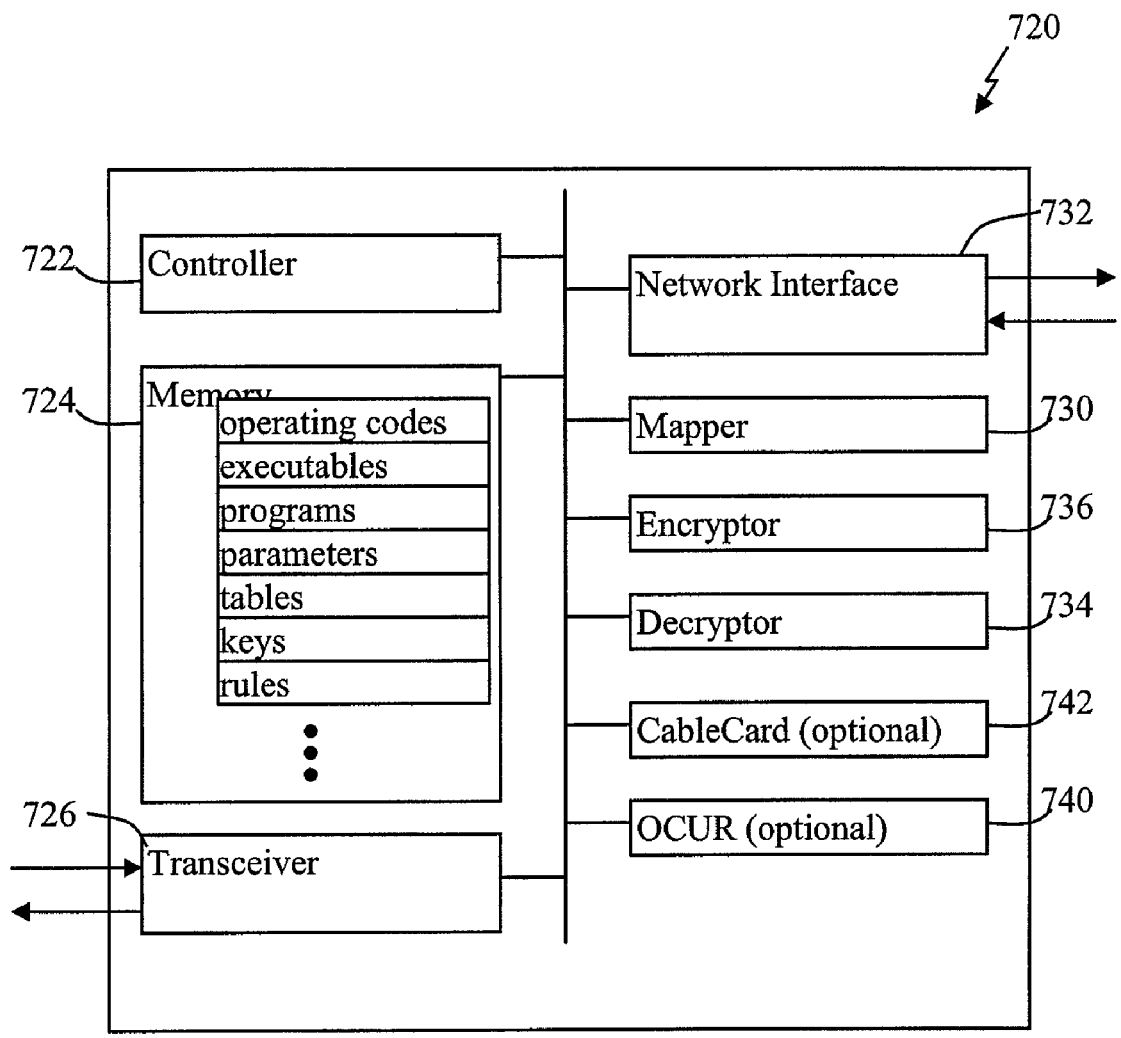
FIG. 7 depicts a simplified block diagram of a DRM-to-DRM transcriptor according to some embodiments that can be implemented in the network of FIG. 1.

FIG. 7 depicts a simplified block diagram of a DRM-to-DRM transcriptor 720 according to some embodiments that can be implemented in the network 120. The DRM-to-DRM transcriptor can be a secure, stand alone device or can be implemented with and/or on a device of the network, such as the media server 122, domain manager 126, stream manager 130 or other device of the network. For example, when implemented as a stand alone device, the transcription can occur within a single ASIC such that security is maintained. The DRM-to-DRM transcriptor 720 includes a controller 722, digital and/or computer memory 724, a bus interface or communication transcriptor 726, and a mapper 730. Some embodiments can additionally include a distributed network interface 732, a decryptor 734, an encryptor 736, an open cable unidirectional receiver (OCUR) 740 and/or cable card 742. As introduced above, in some embodiments, the DRM-to-DRM transcriptor is implemented through a single ASIC, where at least the controller 122, a portion of the memory 124, communication interface 726, mapper 730 and when present the decryptor 734 and/or decryptor 736 are implemented as part of the ASIC.

The controller can be a single or multiprocessor computing system, microprocessor, minicomputer and/or other relevant controller that provides overall operational control of the DRM-to-DRM transcriptor 720. In those instances where the DRM-to-DRM transcriptor is incorporated within another device of the network (e.g., as part of the media server), the controller can be the same controller that controls that device (e.g., the controller of the media server). The memory 724 can be substantially any relevant computer storage medium, such as RAM, ROM, EEPROM, flash memory, optical storage (e.g., digital video disk (DVD), compact disc (CD) and the like), magnetic storage and/or other relevant computer readable medium. Further, the memory stores operating codes and/or programs that dictate the operation of the DRM-to-DRM transcriptor, and can further store executables, programs, parameters, tables, keys, rules and/or other data that are used in implementing the transcription.

The communication interface 726 allows the DRM-to-DRM transcriptor 720 to communicate with the other devices of the network 120 and/or with other components of the device within which the DRM-to-DRM transcriptor is incorporated. The mapper 730 identifies keys, rights, parameters and/or other access criteria for a source DRM and attempts to correlate or map those keys, rights, parameters and the like with keys, rights, parameters and the like of a destination DRM. In those embodiments where the DRM-to-DRM transcriptor performs a transcription to an intermediate DRM, the mapper 730 attempts to map keys, rights, etc. of the source DRM to keys, rights, etc. to the intermediate DRM, and/or from the intermediate DRM to the destination DRM. The mapper can be implemented through a processor, hardware, tables and the like to map between DRMs. The OCUR 740 and/or cable card 742 allow the DRM-to-DRM transcriptor to operate with or within a set-top-box, TV and/or other device that received cable and/or satellite television broadcasts.

In operation, the controller identifies the source DRM (e.g., from the stream manager and/or by querying the media server) and the destination DRM, or an intermediate DRM when appropriate. The destination or sink DRM can be identified, for example, from the stream manager, the media player 124 or the like. The access criteria is utilized in conjunction with parameters, tables, keys, rules and the like stored in memory and/or accessed over the distributed network 140 in the mapper 730 in attempts to map rights, rules, keys and the like from the source DRM to the sink or destination DRM. Once the mapping is complete, the controller 722 evaluates the mapping to determine whether mandatory mappings are achieved (e.g., those rights that have to be mapped, such as limited numbers of plays, copy restrictions, and/or other such required mapping). In those instances where mandatory mapping cannot be achieved, it can attempt to obtain that mapping from a remote source on the distributed network when the DRM-to-DRM transcriptor 720 includes the network interface 732 or the DRM-to-DRM transcriptor can request another device with network access to try and retrieve the desired mapping. When additional mapping is accessed over the network, the mapping can be incorporated into the mapper 730 or maintained at the remote source and utilized locally during the transcription when a transcription can be implemented.

As introduced above, in some embodiments the DRM-to-DRM transcriptor decrypts the access criteria and/or rights prior to determining whether a transcription is performed, to implement the transcription and/or to implement decoding. Further, in many instances where decryption occurs, the DRM-to-DRM transcriptor encrypts the access criteria and/or content prior to distributing the transcripted access criteria and/or code to a sink device.

The DRM-to-DRM transcriptor can also perform transcriptions of device credential of a sink device in determining whether a device can join an authorized domain. This transcription, typically, is similar to the transcription for access criteria and/or content. The transcripted device credentials can be forwarded to the domain manager to be evaluated at least in determining whether the sink device can be added to the authorized domain.

While the invention herein disclosed has been described by means of specific embodiments and applications thereof, numerous modifications and variations could be made thereto by those skilled in the art without departing from the scope of the invention set forth in the claims.

What is claimed is:

1. A method of distributing content over a local network, the method comprising:
   obtaining an access criteria associated with a content protected by a first digital rights management (DRM) system;
   forwarding the access criteria to a sink device that utilizes a second DRM system;
   receiving from the sink device a first evaluation of the access criteria;
   determining, through a processor, based on the first evaluation whether the first DRM is compatible with the second DRM;
   directing the content to the sink device when it is determined that the first DRM is compatible with the second DRM;
   determining whether the access criteria can be transcripted from the first DRM to the second DRM;
   initiating a transcription of the access criteria when the access criteria can be transcripted producing transcripted access criteria;
   forwarding the transcripted access criteria to the sink device;
   receiving from the sink device a second evaluation of the transcripted access criteria;
   determining whether the sink device can utilize the content in response to the second evaluation; and
   directing the content to the sink device when determined that the sink device can utilize the content.

2. The method of claim 1, further comprising:
   determining according to the second evaluation whether the content has to be transcripted before the sink device can utilize the content;
   directing the content to be transcripted producing transcripted content; and
   forwarding the transcripted content to the sink device when it is determined that the content has to be transcripted before the sink device can utilize the content.

3. The method of claim 1, further comprising:
   determining based on the first evaluation that the sink device is not part of an authorized domain;
   receiving device criteria from the sink device;
   determining whether the device criteria has to be transcripted before determining whether the sink device can be added to the authorized domain; and
   forwarding the device criteria to be transcripted producing transcripted device criteria;
   determining based on the transcripted device criteria whether the sink device can be added to the authorized domain.

4. The method of claim 3, wherein the determining based on the transcripted device criteria whether the sink device can be added to the authorized domain comprises forwarding the transcripted device criteria to a domain manager.

5. The method of claim 4, further comprising:
   requesting user interaction prior to adding the sink device to the authorized domain.

6. The method of claim 1, further comprising:
   determining based on the first evaluation whether user interaction is need before the content can be forwarded to the sink device;
   requesting user interaction; and
   determining whether user interaction is sufficient to allow the content to be transferred to the sink device.

7. A system that provides for the distribution of content over a network, the system comprising:
   a content source that stores content protected according to a first digital rights management (DRM);
   a sink device that operates according to a second DRM;
   a stream manager communicationally coupled with the content source and the sink device, wherein the stream manager retrieves access criteria for the content from the content source and forwards the access criteria to the sink device, receives a first evaluation of the access criteria from the sink device, determines based on the first evaluation whether the sink device can utilize the content protected according to the first DRM and initiates a transfer of the content to the sink device when the sink device can utilize the content protected according to the first DRM; and a DRM-to-DRM transcriptor communicationally coupled with the stream manager to receive the access criteria and to transcript the access criteria to the second DRM producing transcripted access criteria where the stream manager forwards the transcripted access criteria, receives a second evaluation of the transcripted access criteria from the sink device, determines based on the second evaluation whether the sink device can utilize the content and initiates a transfer of the content to the sink device when the sink device can utilize the content.

8. The system of claim 7, further comprising:

a domain manager communicationally coupled with the stream manager, wherein the domain manager adds the sink device to an authorized domain.

* * * * *

UNITED STATES PATENT AND TRADEMARK OFFICE
CERTIFICATE OF CORRECTION

PATENT NO. : 7,644,044 B2 Page 1 of 1
APPLICATION NO. : 11/696324
DATED : January 5, 2010
INVENTOR(S) : Brant Candelore It is certified that error appears in the above-identified patent and that said Letters Patent is hereby corrected as shown below:

Claim 6, column 20, line 46, delete "need" and insert --needed--.

Signed and Sealed this

Twenty-seventh Day of April, 2010

David J. Kappos
*Director of the United States Patent and Trademark Office*